(12) United States Patent
Hars

(10) Patent No.: US 8,356,178 B2
(45) Date of Patent: Jan. 15, 2013

(54) METHOD AND APPARATUS FOR AUTHENTICATED DATA STORAGE

(75) Inventor: Laszlo Hars, Cranberry Township, PA (US)

(73) Assignee: Seagate Technology LLC, Cupertino, CA (US)

( * ) Notice: Subject to any disclaimer, the term of this patent is extended or adjusted under 35 U.S.C. 154(b) by 1204 days.

(21) Appl. No.: 11/598,409

(22) Filed: Nov. 13, 2006

(65) Prior Publication Data

US 2008/0114981 A1      May 15, 2008

(51) Int. Cl.
   *H04L 29/06*   (2006.01)

(52) U.S. Cl. ........ 713/170; 713/165; 713/167; 713/161; 713/168; 726/23; 726/30; 711/164; 380/28

(58) Field of Classification Search .......... 713/161–179; 726/26–29, 22, 2; 370/469–470
   See application file for complete search history.

(56) References Cited

U.S. PATENT DOCUMENTS

| | | | |
|---|---|---|---|
| 4,933,969 A * | 6/1990 | Marshall et al. ............... | 713/177 |
| 4,941,176 A * | 7/1990 | Matyas et al. ................. | 380/280 |
| 5,050,212 A | 9/1991 | Dyson | |
| 5,432,849 A | 7/1995 | Johnson et al. | |
| 5,442,645 A | 8/1995 | Ugon et al. | |
| 5,799,089 A | 8/1998 | Kuhn et al. | |
| 6,026,293 A | 2/2000 | Osborn | |
| 6,122,738 A | 9/2000 | Millard | |
| 6,161,183 A * | 12/2000 | Saito et al. ..................... | 713/176 |
| 6,345,360 B1 | 2/2002 | Kamada et al. | |
| 6,581,173 B2 | 6/2003 | Poisner | |
| 6,665,420 B1 * | 12/2003 | Xie et al. ....................... | 382/100 |
| 6,842,860 B1 | 1/2005 | Branstad et al. | |
| 6,912,634 B2 * | 6/2005 | Ripley et al. ................... | 711/164 |
| 6,941,461 B2 | 9/2005 | Carro et al. | |
| 6,950,517 B2 | 9/2005 | Hawkes et al. | |
| 6,973,187 B2 * | 12/2005 | Gligor et al. .................... | 380/28 |
| 7,043,636 B2 | 5/2006 | Smeets | |
| 7,058,819 B2 * | 6/2006 | Okaue .......................... | 713/193 |
| 7,333,284 B2 * | 2/2008 | Eto et al. ......................... | 360/71 |
| 7,362,529 B2 * | 4/2008 | Chiao et al. ..................... | 360/48 |
| 7,454,797 B2 * | 11/2008 | Zhu et al. ......................... | 726/30 |
| 7,487,365 B2 * | 2/2009 | England et al. ................... | 713/193 |
| 7,624,276 B2 * | 11/2009 | Princen et al. ................. | 713/177 |
| 7,650,499 B2 * | 1/2010 | Ittogi ............................. | 713/161 |
| 7,660,421 B2 * | 2/2010 | Hopkins et al. ............... | 380/277 |
| 7,715,360 B2 * | 5/2010 | Chun et al. ..................... | 370/349 |
| 7,725,719 B2 * | 5/2010 | Sandberg et al. ............. | 713/170 |
| 7,961,759 B2 * | 6/2011 | May et al. ..................... | 370/503 |
| 2002/0087818 A1 * | 7/2002 | Ripley et al. .................. | 711/164 |

(Continued)

OTHER PUBLICATIONS

Jun Yang, Fast Secure PRocessor for inhibiting software piracy and tampering, Dec. 2003, IEEE, Micro 36, pp. 3-6.*

(Continued)

*Primary Examiner* — Nathan Flynn
*Assistant Examiner* — Viral Lakhia
(74) *Attorney, Agent, or Firm* — Cesari & Reed, LLP; Kirk A. Cesari

(57) ABSTRACT

A method includes: computing a first message authentication code for each of a plurality of sets of data blocks on a data storage medium, and authenticating the sets of data blocks by computing a second message authentication code for each of the sets of data blocks to be authenticated and comparing the first and second message authentication codes. An apparatus that performs the method is also provided.

19 Claims, 4 Drawing Sheets

U.S. PATENT DOCUMENTS

| | | | | |
|---|---|---|---|---|
| 2003/0195033 | A1* | 10/2003 | Gazdic et al. | 463/20 |
| 2004/0010468 | A1* | 1/2004 | Abe et al. | 705/50 |
| 2004/0015761 | A1* | 1/2004 | Klotz et al. | 714/738 |
| 2004/0015762 | A1* | 1/2004 | Klotz et al. | 714/742 |
| 2004/0111618 | A1* | 6/2004 | Vaha-Sipila | 713/176 |
| 2005/0050357 | A1* | 3/2005 | Jeng et al. | 713/201 |
| 2005/0071640 | A1* | 3/2005 | Sprunk et al. | 713/176 |
| 2006/0000891 | A1* | 1/2006 | Bonalle et al. | 235/380 |
| 2006/0026433 | A1* | 2/2006 | Montenegro | 713/181 |
| 2006/0136715 | A1* | 6/2006 | Han et al. | 713/151 |
| 2006/0137015 | A1* | 6/2006 | Fahrny et al. | 726/26 |
| 2006/0271796 | A1* | 11/2006 | Kaimal et al. | 713/194 |
| 2007/0015590 | A1* | 1/2007 | Jackson et al. | 463/43 |
| 2007/0016797 | A1* | 1/2007 | Shishikura | 713/187 |
| 2007/0037555 | A1* | 2/2007 | Lee et al. | 455/411 |
| 2007/0061570 | A1* | 3/2007 | Holtzman et al. | 713/168 |
| 2007/0061597 | A1* | 3/2007 | Holtzman et al. | 713/193 |
| 2007/0116276 | A1* | 5/2007 | Tsurumoto | 380/201 |
| 2007/0219917 | A1* | 9/2007 | Liu et al. | 705/59 |
| 2007/0234420 | A1* | 10/2007 | Novotney et al. | 726/16 |
| 2007/0255947 | A1* | 11/2007 | Choudhury et al. | 713/161 |
| 2007/0300293 | A1* | 12/2007 | Tsutsui et al. | 726/5 |
| 2008/0077794 | A1* | 3/2008 | Arnold et al. | 713/169 |

OTHER PUBLICATIONS

S. R. Snapp et al., "A System for Distributed Intrusion Detection", IEEE, 1991, pp. 170-176.

M. Bellare et al., "Message Authentication Using Hash Functions—The HMAC Construction", Appears in RSA Laboratories' CryptoBytes, vol. 2, No. 1, Spring 1996, pp. 1-5.

M. Bellare et al., "Keying Hash Functions for Message Authentication", An abridged version of this paper appears in Advances in Cryptology—Crypto 96 Proceedings, Lecture Notes in Computer Science, vol. 1109, N. Koblitz ed., Springer-Verlag, 1996, Jun. 1996, pp. 1-19.

H. Gobioff et al., "Integrity and Performance in Network Attached Storage", Dec. 1998, pp. 1-22.

"The Keyed-Hash Message Authentication Code (HMAC)", FIPS Publication 198, Information Technology Laboratory, NIST, Gaithersburg, MD, Mar. 6, 2002, pp. i-13.

A. G. Pennington et al., "Storage-based Intrusion Detection: Watching Storage Activity for Suspicious Behavior", Appears in Proceedings of the 12th USENIX Security Symposium, Washington, DC, Aug. 2003, pp. 1-15.

J. L. Griffin et al., "On the Feasibility of Intrusion Detection Inside Workstation Disks", Dec. 2003, 29 pgs.

K. Gjosteen, "Security Notions for Disk Encryption", Apr. 18, 2005, pp. 1-20.

D. McGrew, "Efficient Authentication of Large, Dynamic Data Sets Using Galois/Counter Mode (GCM)", 7 pgs.

D. A. McGrew et al., "The Security and Performance of the Galois/Counter Mode (GCM) of Operation (Full Version)", 21 pgs.

* cited by examiner

METHOD AND APPARATUS FOR AUTHENTICATED DATA STORAGE

FIELD OF THE INVENTION

This invention relates to data storage devices, and more particularly to methods and apparatus for authenticating data stored in data storage devices.

BACKGROUND OF THE INVENTION

Secure data storage devices encrypt the stored data and include means for controlling access to the data. Without proper authorization, the device does not grant access even to the encrypted data via the storage device interface. However, because physical protection of storage devices is very expensive and in many cases impractical, physical attacks such as disassembling a disc drive and putting the platters on a spin stand with microscopic magnetic detectors, or simply connecting the head signal to another disc controller, could still remain possible. Thus, encryption does not necessarily protect data from modification by an unauthorized party.

When an unauthorized party gains write access to the storage device, he can cause damage, for example by writing back older contents to the same location in the storage medium, or by copying over data from other locations. Since there is no inexpensive physical way to prevent this, a cryptographic method to detect unauthorized changes of the stored data is needed to give a warning to the user that the data has been tampered with.

Traditionally, expensive, fragile physical tamper detectors are employed for this task, like seals on the disc drive enclosure, which tell the user if the drive has been opened.

It would be desirable to provide a tamper detection method that does not rely on physical tamper detectors.

SUMMARY OF THE INVENTION

In a first aspect, the invention provides a method including: computing a first message authentication code for each of a plurality of sets of data blocks on a data storage medium, and authenticating the sets of data blocks by computing a second message authentication code for each of the sets of data blocks to be authenticated and comparing the first and second message authentication codes.

The sets of data blocks are deemed to have been changed if the first and second message authentication codes are different. Each of the sets of data blocks can contain data in one track of a disc storage medium. The message authentication codes can be stored on a storage medium or in a table in nonvolatile memory, and they can be organized in a tree structure.

In another aspect, the invention provides an apparatus comprising a processor for computing a first message authentication code for each of a plurality of sets of data blocks on a data storage medium, and for authenticating the sets of data blocks by computing a second message authentication code for each of the sets of data blocks to be authenticated and comparing the first and second message authentication codes.

DETAILED DESCRIPTION OF THE INVENTION

Figure 1:
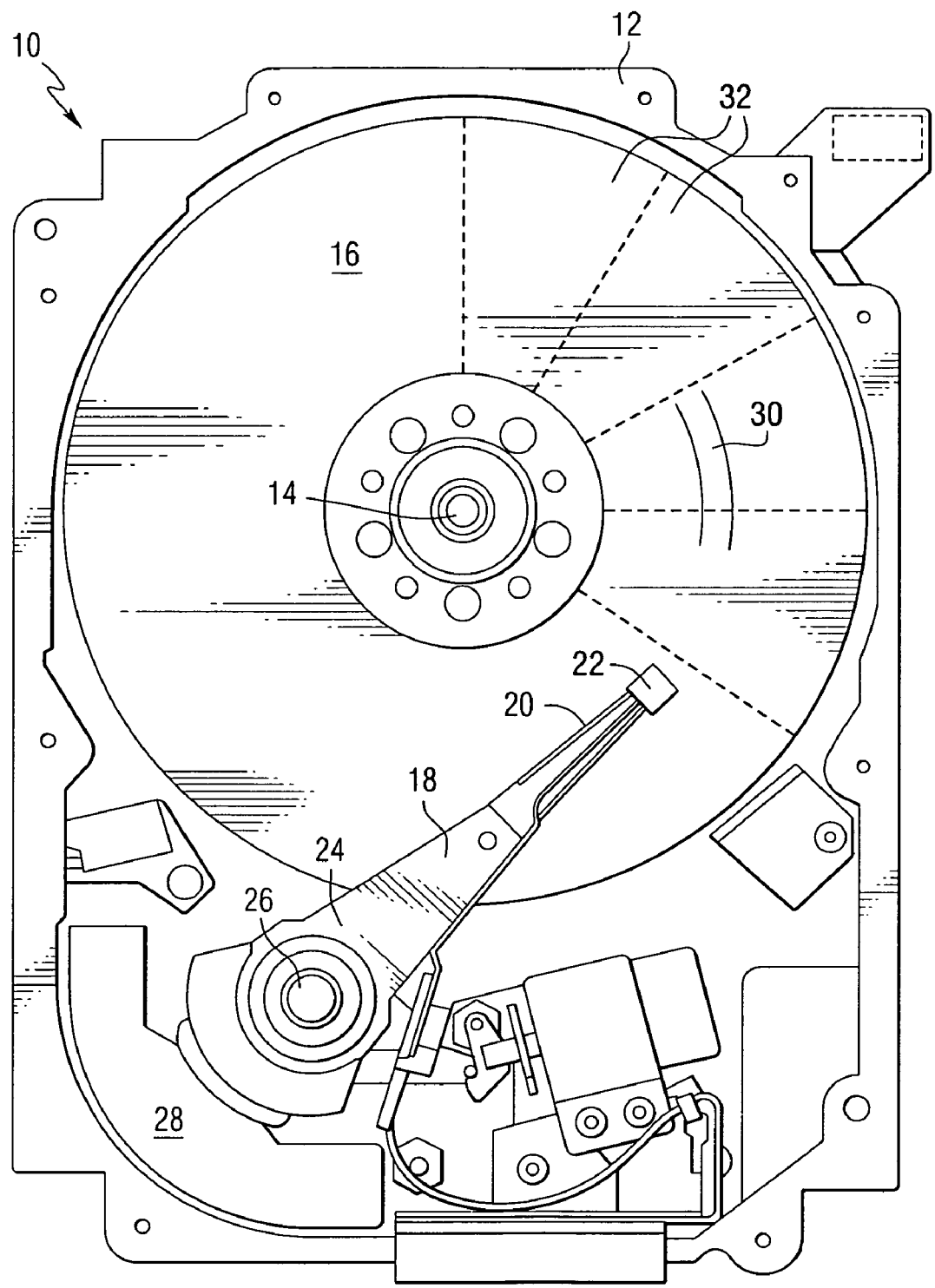
FIG. 1 is a pictorial representation of a disc drive that can be constructed in accordance with an embodiment of the invention.

Referring to the drawings, FIG. 1 is a pictorial representation of a data storage device in the form of a disc drive 10 that can be operated in accordance with an embodiment of the invention. The disc drive includes a housing 12 (with the upper portion removed and the lower portion visible in this view), sized and configured to contain the various components of the disc drive. The disc drive also includes a spindle motor 14 for rotating at least one data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 to position the head 22 over a desired track on the disc 16. The actuator motor 28 is controlled by a controller that is not shown in this view. Data is stored in concentric tracks 30 on the disc. If multiple discs are included, corresponding tracks on the multiple discs form a cylinder. The tracks are divided into sectors 32 and blocks of data are stored in the sectors.

Figure 2:
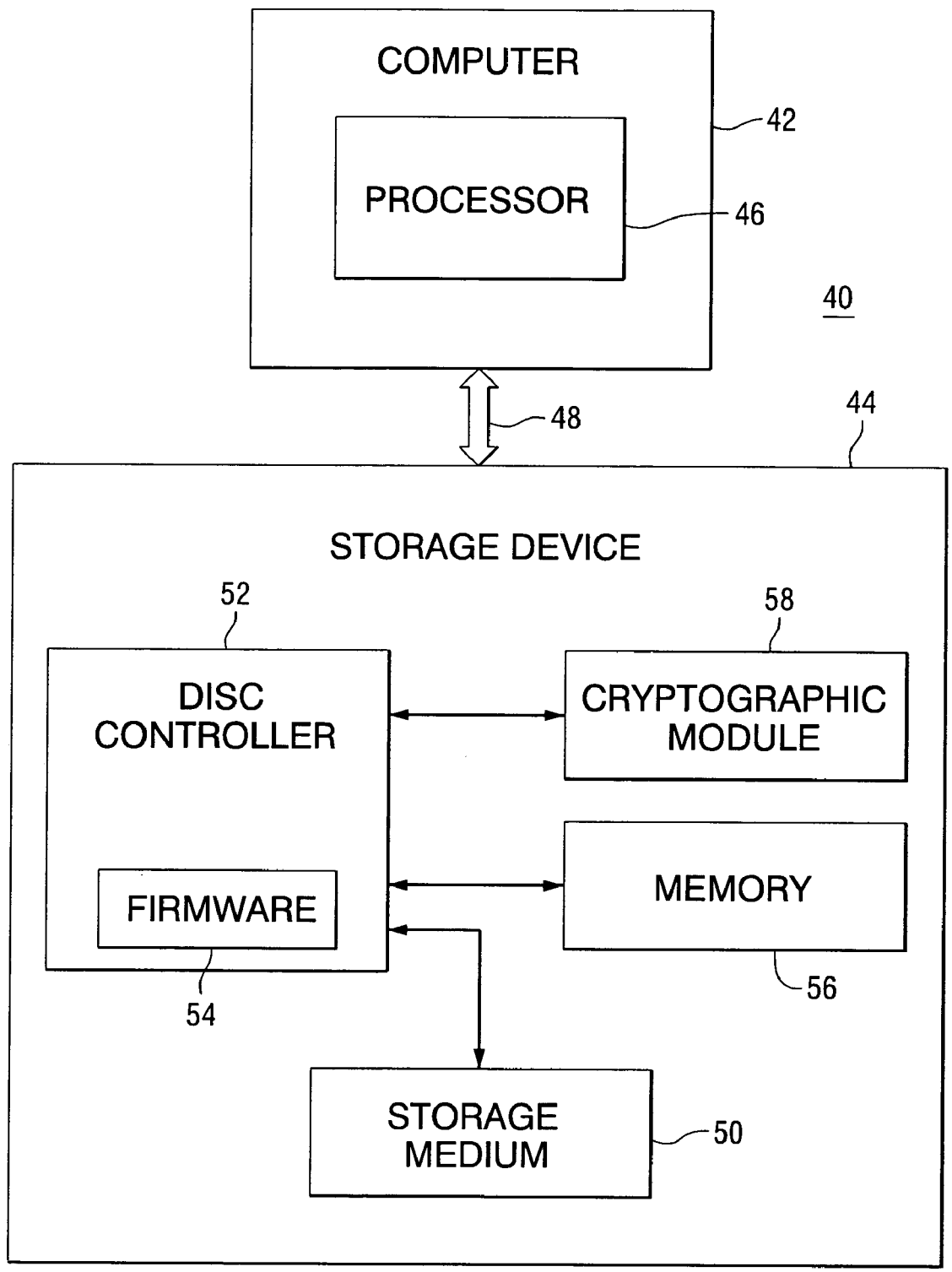
FIG. 2 is a block diagram of a system that includes a data storage device that can be constructed in accordance with an embodiment of the invention.

FIG. 2 is a block diagram of an apparatus 40 that can be constructed in accordance with an embodiment of the invention. The apparatus includes a computer 42 and a data storage device 44, which may be for example a disc drive, probe storage device, memory card, flash drive, or other storage device. The computer 42 includes a processor 46 that operates in accordance with a host operating system and communicates with the data storage device over a channel 48. The computer would also include other components commonly found in computers, but not shown in this figure, such as input and output devices and memory components. The processor 46 can be operated to perform the various reading, writing and encryption functions described in this description.

The data storage device includes some type of storage medium 50, such as a magnetic or optical storage medium, a ferroelectric storage medium, or a solid-state memory, and a controller 52 that controls the storage of data on the medium. The controller can run firmware 54 that is included in the data storage device and used to process data that is to be written to and/or read from the storage medium. Additional components, including a memory 56 and cryptographic module 58 can be included to facilitate processing of the data. The controller can contain a processor that performs various functions in response to firmware 54. While the cryptographic module can be inside the storage device as shown in FIG. 2, it can also be implemented in software in the host computer (e.g., in the host operating system), or it could be inserted in the data path between the host and the data storage device.

In one aspect, this invention provides a cryptographic method of tamper detection, which relies on a secret key, that an unauthorized person does not know. The method uses cryptographic message authentication codes (MACs) to provide a data integrity check based on a secret key. A cryptographic message authentication code is a short piece of information used to authenticate a data string. A message authentication code can be considered to be a cryptographic checksum that results from passing data through a message authentication algorithm. The MAC algorithm accepts as inputs a secret key and an arbitrary length data string to be authenticated, and outputs a MAC, which is sometimes referred to as a tag. The MAC value can be used to protect both a data string's integrity and authenticity, by allowing verifiers who also possess the secret key to detect any changes to the data string content.

A hash function is a mathematical function that maps a data string of arbitrary length to a fixed length data string. Hash function-based MACs use a key or keys in conjunction with a hash function to produce a checksum that is appended to a data string. The MAC of the data cannot be constructed without the knowledge of the secret key.

In one example, data authentication can be provided by an updatable, keyed hash, like a Galois Message Authentication Code (GMAC), which is used to produce a tag or signature of a data string. These codes have the property that, when a change is made in the middle of a data string, the tag or signature can be updated without reading the entire data string.

A GMAC is a block cipher code that can be used to provide data authentication. It is defined in terms of a Galois/Counter Mode (GCM) authenticated encryption operation. The GCM authenticated encryption operation has four inputs: a secret key, an initialization vector (IV), a plaintext, and an input for additional authenticated data (AAD). It has two outputs: a ciphertext whose length is identical to the plaintext and an authentication tag. GMAC is the special case of GCM in which the ciphertext output is ignored, so that the only output of the function is the authentication tag.

Figure 3:
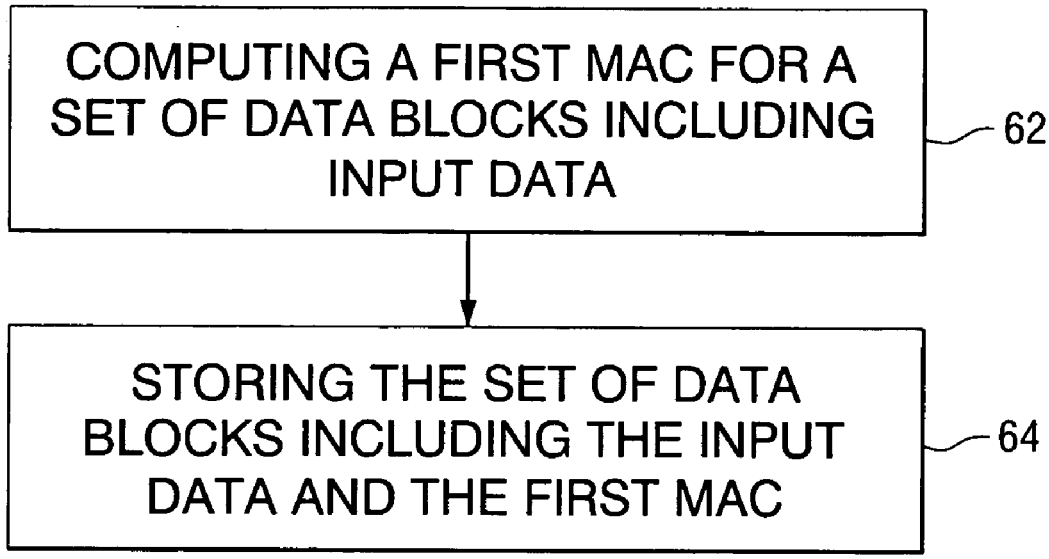
FIGS. 3 and 4 are flow diagrams that illustrate one embodiment of the method of the invention.
Figure 4:
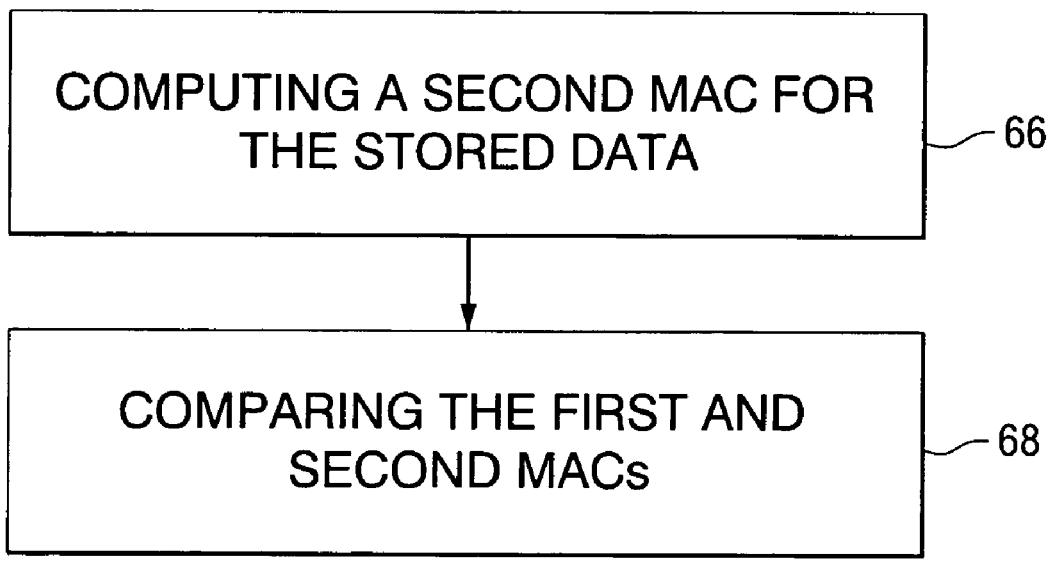

FIGS. 3 and 4 are flow diagrams that illustrate one embodiment of the method of the invention. When data is written to the storage device, a first MAC is computed and stored on the medium or in other nonvolatile memory. When data is read from the storage device during authentication, a second MAC is computed and compared to the stored first MAC. If the first and second MACs don't match, the data has been illicitly changed and the user would be warned. The MACs can be computed, for example, by a host computer, in the storage device, or in an independent encryption module. The key used to compute the MACs can be stored in the same key store where the encryption key is stored. The key store can be internal to the authentication module, or external, in which case a secure key transfer protocol has to be implemented. In one embodiment, the MACs can be GMACs.

Data stored in a secure disc drive cannot be changed while the disc drive is powered up. Therefore, it is normally enough to authenticate a set of data blocks only once in a power cycle, and mark the data blocks as properly authenticated or as changed. These marks can be stored in volatile random access memory and cleared during power down.

As shown in FIG. 3, when data is to be written to a storage medium, a MAC function can be used to produce a first MAC that is formed by combining a secret key and the input data (block 62) and all the already stored data blocks belonging to the same set. The first MAC can then be stored in the data storage device along with the input data (block 64). The manner in which the MAC is linked to the data is left to the implementer. For example, the MAC can be either attached to the data blocks, or the software/disc firmware can maintain pointers that link the data to the MAC.

To verify the integrity of stored data, as shown in FIG. 4, the storage device computes the MAC for the stored data using the same key and MAC function as was used when the data was stored (block 66), and compares the result with the previously computed MAC (block 68). If the two values match, the stored data is deemed to have been authenticated.

If the two values do not match, the user can be notified, for example by a message on a user interface, of the failure to authenticate the data.

For verification of the integrity of all data in a data storage device, every block has to be read, which is a slow process, even though it has to be performed only once per session, for example after a successful user authentication, or before terminating the session, that is, before the user logs off.

This invention improves the speed of the process by maintaining many message authentication code (MAC) values, corresponding to sets of data blocks, which are accessible without significant time overhead. For example, for every track of a disc drive, an updatable MAC could be maintained. Thus the invention uses the physical characteristics of the storage device to group blocks together, which can be accessed without a new seek operation, that is only at most twice slower than reading a single block, in the average.

In one embodiment of the invention, the blocks of data are grouped, so they can be accessed on a disc quickly, that is, without performing a seek operation or waiting until the desired block arrives under the head during a disc revolution. Half the track, or every other sector in a track are theoretically possible (as are many other portions or groups of data), but they all lose time compared to a whole track access, because the track can be read or written from any starting position, that is, there is no latency after a seek operation.

When a data block is to be accessed (i.e., read) by a user, and the block set containing that data block has not yet been authenticated, the block set can be authenticated by the disc firmware, and a warning given to the user if an authentication failure occurs.

When the disc drive is idle, it can test all the stored MAC values as a background process and verify them. The ones that pass can be identified in a volatile table, which can be stored in RAM, so that when a user wishes to access data, the table can be checked to determine if the desired data has been authenticated. If so, then subsequent access to that data will be substantially instantaneous. The table can be erased when a user logs off of the system or when power is lost.

The addition of a message authentication code allows the detection of whether or not the original data has been modified. In this context, a message authentication code is a sequence of bits added to the original data. Modifications are detected by comparing the stored data with a MAC checksum that is derived from the stored data and a secret key. If the output matches the stored data, then the stored data is considered to be authentic.

Figure 5:
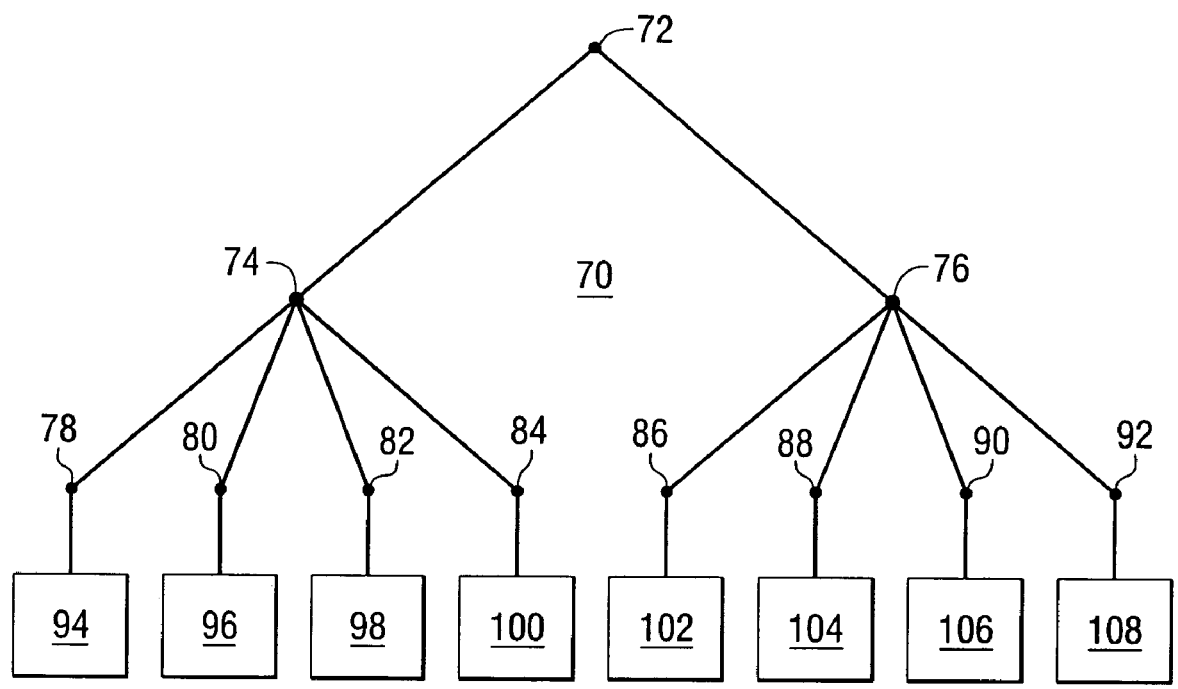
FIG. 5 is a schematic representation of such a message authentication code tree structure.

Another example utilizes a balanced tree of MACs. In this example, a plurality of first MACs is computed for a plurality of sets of data blocks and a plurality of additional MACs is computed for groups of the first MACs. Then the first MACs and the additional MACs are organized to each other in a tree structure. FIG. 5 is a schematic representation of such a tree structure 70. The tree contains a plurality of nodes 72, 74, 76, 78, 80, 82, 84, 86, 88, 90 and 92 arranged in a hierarchical structure. In this example, node 72 is a root node, and nodes 74 and 76 are the children of the root node. Nodes 78, 80, 82 and 84 are the children of node 74, and nodes 86, 88, 90 and 92 are the children of node 76. While FIG. 5 shows an example where the MACs at nodes 74 and 76 are computed for groups of four of the first MACs, the additional MACs can be computed using a different number of the first MACs.

Each node in the tree contains a MAC of the data or the MACs of its children nodes. At the lowest level, the nodes contain the MAC of the data in a set of data blocks 94, 96, 98, 100, 102, 104, 106 and 108. When a write operation occurs for data in one of the sets of data blocks, only the MACs on the path from the changed block to the root have to be updated (i.e., recomputed).

Trees are standard data structures in computer science. They can be implemented with pointers to the address of the parent node. The storage device can keep track of the relationships between blocks of data and the MACs using pointers or address tables, in accordance with known programming methods.

If no data is changed, in a block of data that are authenticated together, the MAC for that block remains the same. If a node has all of its children unchanged further up in the tree, the MAC in that node does not change either. Therefore, it is only necessary to modify the MAC at the parent, the parent's parent, etc. nodes of a changed block, up to the root.

An attack possibility is that an attacker can replace a whole set of data blocks with their old content and with the corresponding old MAC. Because the old MAC was valid when computed, it is still valid. To detect this kind of replay attack, the MAC of the corresponding block set must be computed and checked to determine if the MAC is valid. Then the next higher level in the tree of MACs is checked, and so on. Since the MAC at the root depends on every data block, only a complete restore of the disc data to a previous state succeeds; no smaller replays are possible. Consequently, at authentication of the accessed data, all the MAC values from the current block along the path to the root have to be recomputed and verified.

There is large flexibility in the tree structure. While FIG. 5 shows a simplified tree structure in a more practical system, the first level of nodes could have 16 children, and higher level nodes could have more or less. Assuming $2^{48}$ logical block addresses (LBAs), the maximum accessible by different disc standards, and 16 children for every node, the path from each first level node to the root node has a length of 12. Upon the occurrence of a write operation, 15 other data block sets have to be read and hashed, and on the path to the root node, 11 other hash operations are to be performed on cached data. While this requires some extra processing, the overhead in processing time would be manageable, especially if the 16 data blocks are next to each other, so that they can be accessed fast.

When implementing this invention, the storage overhead is also small. For example, 128-bit MAC values need little more than 16 B of storage for every 16 LBAs, which is one byte per LBA, or less than 0.2% loss of a disc capacity with 512 B blocks, or eight times less with 4 KB blocks. The MAC values could even be stored in FLASH memory, or other nonvolatile RAM. The RAM can be located in the data storage device, but can also be located elsewhere.

Other message authentication codes can be used, such as other hash function-based message authentication codes, one-key message authentication codes, or parallelizable message authentication codes.

While the invention has been described in terms of several examples, it will be apparent to those skilled in the art that various changes can be made to the described examples without departing from the scope of the invention as set forth in the following claims.

What is claimed is:

1. A method comprising:
   computing a first message authentication code (MAC) for a set of data blocks of a data storage medium, wherein the first MAC is calculated based on data in the data blocks which are selected to be included in the calculation of the first MAC based on a physical arrangement of the data blocks in the data storage medium;
   storing the set of data blocks and the first MAC to a data storage medium;
   retrieving the set of data blocks and the first MAC from the data storage medium;
   computing a second MAC for the set of data blocks, the second MAC calculated based on data in the data blocks retrieved from the data storage medium;
   comparing the first MAC and second MAC;
   determining if data in the set of data blocks has been changed based on the comparing the first MAC to a second MAC; and
   providing access to data in the set of data blocks when the first MAC and the second MAC match.

2. The method of claim 1, wherein the set of data blocks are deemed to have been changed if the first MAC and second MAC are different.

3. The method of claim 1, further comprising:
   authenticating data of the data storage medium by performing MAC comparisons for multiple sets of data blocks, the authenticating including for each of the multiple sets of data blocks:
   calculating a first MAC for a selected set of data blocks;
   storing the first MAC and the selected set of data blocks to a data storage medium at a first point in time;
   retrieving the first MAC and the selected set of data blocks from the data storage medium at a second point in time that is later than the first point in time;
   calculating a second MAC for the selected set of data blocks;
   comparing the first MAC to the second MAC to determine if the first MAC and the second MAC match;
   storing results of the comparing for the selected set of data blocks in a list of indicators that indicate a MAC comparison result corresponding to the multiple sets of data blocks; and
   processing the list to determine if a MAC comparison result is in the list for the particular set of data blocks; and
   providing access to the specific data when an indicator associated with the particular set of data blocks corresponding to the read request is included in the list.

4. The method of claim 3, further comprising:
   computing an additional MAC for a selected group of the first MACs; and
   organizing the additional MAC and the selected group of the first MACs in a hierarchical tree structure.

5. The method of claim 3, further comprising authenticating a set of data blocks only once in a power cycle, and storing an indicator of an authentication result in the list.

6. The method of claim 3, further comprising:
   the first MAC is computed and stored in a memory at the first point in time when the selected set of data is stored to a data storage medium and is determined via a first MAC calculation method; and
   the second MAC is computed and compared to the first MAC, which was previously stored in a memory, the second MAC computed when the selected set of data is retrieved from the data storage medium, the second MAC also calculated using the first MAC calculation method.

7. The method of claim 6 further comprising when the second MAC does not match the first MAC, a warning is sent to a user.

8. The method of claim 3, further comprising:
   determining if more than one set of data blocks has been changed based on comparing a generated MAC with a stored MAC while a storage device containing the storage medium is in an idle state;

storing in the list an indicator that a data block has been checked and the first MAC and the second MAC associated with the data block matched during the comparing the first MAC and second MAC;

processing the list to determine if a set of data blocks corresponding to a read request has been changed; and providing access to the set of data blocks corresponding to the read request when an indicator associated with the set of data blocks corresponding to the read request is included in the list.

9. A method comprising:

retrieving a selected set of data blocks from a data storage medium, the selected set of data blocks having a corresponding message authentication code (MAC);

determining if the selected set of data blocks has been changed based on comparing a generated MAC with the corresponding MAC;

storing in a table an indicator corresponding to the selected set of data blocks when the selected set of data blocks is determined not to have been changed; and upon a later request for data within the selected set of data blocks, providing access to the selected set of data blocks without comparing a stored MAC to another MAC when the indicator associated with the selected set of data blocks is in the table.

10. The method of claim 9 further comprising during an idle state of a data storage device, repeating the method for at least one other set of data blocks that has a corresponding MAC wherein the repeating is not in response to a read request for data stored in the at least one other set of data blocks.

11. The method of claim 9 further comprising during an idle state of a data storage device, repeating the method for every set of data blocks that has a corresponding MAC.

12. The method of claim 9 further comprising wherein the generated MAC is generated after the selected set of data blocks is retrieved from the data storage medium and the determined MAC was stored prior to retrieving the selected set of data blocks.

13. The method of claim 9 further comprising wherein providing access further comprises providing access to the selected set of data blocks in response to a read request corresponding to data stored in the selected set of data blocks.

14. The method of claim 9 further comprising processing the list to determine if a selected set of data blocks has been changed instead of comparing a stored MAC to a generated MAC.

15. The method of claim 9 further comprising only storing an indicator in the table when an indicator identifies a set of data blocks that has been determined not to be changed based on a MAC comparison.

16. A device comprising:

a processor adapted to:

retrieve a specific set of data blocks from a data storage medium;

retrieve a stored authentication code associated with the specific set of data blocks;

determine a second authentication code based on data stored in the specific set of data blocks;

store in a table an indicator of whether the specific set of data blocks has been changed based on comparing the stored authentication code and the second authentication code;

receive a read request to access data within the specific set of data blocks; and provide access to the data associated with the read request based on an indicator in the table without making another MAC comparison.

17. The device of claim 16 further comprising a data storage medium and the set of data blocks are selected to be included in a calculation of the stored authentication code based on a physical arrangement of the set of data blocks in the data storage medium, and the stored authentication code and the second authentication are each calculated based on data stored in the specific set of data blocks, wherein if data within the specific set of data blocks changes in-between when the stored authentication code is calculated and the second authentication code is calculated, access to the data within the specific set of data blocks is denied.

18. The device of claim 17 wherein the data storage medium comprises a disc data storage medium and the physical arrangement of the set of data blocks is a track of a data storage device; wherein the specific set of data blocks is selected because each data block of the specific set of data blocks reside on a single track of the disc data storage medium.

19. The device of claim 16 further comprising the processor further adapted to:

during an idle time of the data storage medium, determine if multiple selected sets of data blocks on the data storage medium that have an associated authentication code have been changed, and store an indicators for each compared set of data blocks in the table that identify if the corresponding set of data blocks has been determined to have not been changed based on an associated authentication code for a compared set of data blocks; and provide access to data stored in a specific set of data blocks when the set of data blocks has a corresponding indicator in the table without requiring a MAC comparison for the set of data blocks.

* * * * *